UNITED STATES PATENT OFFICE.

WILLIAM C. McLAUGHLIN, OF OAKLAND, CALIFORNIA, ASSIGNOR OF ONE-FOURTH TO FREDERICK E. WHITNEY, OF OAKLAND, CALIFORNIA.

EXPLOSIVE.

968,389.  Specification of Letters Patent. Patented Aug. 23, 1910.

No Drawing. Application filed October 6, 1909. Serial No. 521,406.

*To all whom it may concern:*

Be it known that I, WILLIAM C. MC-LAUGHLIN, a citizen of the United States, residing at Oakland, in the county of Alameda and State of California, have invented new and useful Improvements in Explosives, of which the following is a specification.

My invention relates to an improved explosive which is especially desirable for mining in confined spaces, and also for use in guns and the like.

My invention consists of the improved compound which I will hereinafter fully describe and claim.

In carrying out my invention I proceed substantially as follows: Sixteen ounces of chlorate of potash which has been thoroughly pulverized and one half an ounce of soot in a dry condition, are thoroughly mixed in any suitable manner. Sixteen ounces of sugar and one dram of spirits of wine or alcohol are then stirred together until the sugar is all moistened. Four ounces, dry weight, of rice, or equivalent cereal, are boiled in water to form an extract or paste which after straining is concentrated by boiling to two and one half ounces, after which the extract is mixed with the previously prepared sugar and spirit and is cooked, continually stirring until it will form a thread-like string after each drop when lifted and allowed to fall back. This is then taken from the fire, the stirring continued and the previously prepared chlorate and soot added until it thickens or recrystallizes. When sufficiently stiff and dry it is passed through a screen to complete the granulation. The cereal has, as one effect, to partially granulate or separate the mass which would otherwise become a hard compact cake, which could not be properly granulated, and it somewhat retards the violent explosive action of the chlorate. About one-half a dram of sulfur and one-half a dram of aluminum are finally added and stirred or rubbed in, the aluminum giving the grains a bright or steel color. Soot from fats or grease is not desirable, but it should be absolutely dry and free from any greasy consistency.

By actual test this powder has been found to be exceedingly useful for guns for sporting and like purposes; the noise and recoil being greatly reduced, and the interior of the gun is very little fouled after much shooting. It is believed that the extract of rice or other cereal has a considerable influence in keeping the interior of the gun clean. When used for blasting and mining purposes in confined shafts and tunnels under ground, it is found that there is no poisonous fumes or gases which will injure anything.

Powder thus made can be wet without losing its strength; all that it is necessary to do is to dry it and recrush, or granulate it by passing through a screen as before.

Having thus described my invention what I claim as new and desire to secure by Letters Patent is:

An explosive compound composed of chlorate of potash, soot, sugar, spirits of wine, a cereal paste, sulfur, and aluminum in substantially the proportions specified.

In testimony whereof I have hereunto set my hand in the presence of two subscribing witnesses.

WILLIAM C. McLAUGHLIN.

Witnesses:
W. R. THOMAS,
W. T. VAHLBERG.